United States Patent [19]
Wilfert

[11] 3,719,245
[45] March 6, 1973

[54] VEHICLE STRUCTURE

[75] Inventor: Karl Wilfert, Gerlingen-Waldstadt, Germany

[73] Assignee: Daimler-Benz Aktiengesellschaft, Stuttgart-Unterturkheim, Germany

[22] Filed: Aug. 26, 1970

[21] Appl. No.: 67,142

[30] Foreign Application Priority Data

Aug. 27, 1969 Germany..................P 19 43 485.6

[52] U.S. Cl. ...................................180/90, 296/84 R
[51] Int. Cl. .................................................B60k 37/00
[58] Field of Search ...180/90, 69; 296/286, 37, 37.2, 296/84, 94

[56] References Cited

UNITED STATES PATENTS

| | | | |
|---|---|---|---|
| 2,871,968 | 2/1959 | Glacosa | 296/37.2 X |
| 3,314,195 | 4/1967 | Ziegler | 296/84 R X |
| 2,998,280 | 8/1961 | Barényi | 180/90 X |
| 2,295,750 | 9/1942 | Norris et al. | 180/90 X |
| 3,439,769 | 4/1969 | Brilmyer | 180/90 |
| 2,818,933 | 1/1958 | Tell | 180/90 |
| 1,353,427 | 9/1920 | Seguin | 180/90 |
| 2,075,936 | 4/1937 | Graebner et al. | 296/28 G |

Primary Examiner—Kenneth H. Betts
Assistant Examiner—John P. Silverstrim
Attorney—Craig, Antonelli and Hill

[57] ABSTRACT

A vehicle structure disposed in the forward part of a passenger space, particularly of a passenger motor vehicle which serves for the accommodation and mounting of auxiliary installations, instruments and the like; the structure thereby projects into the vehicle interior space in a generally rearward direction and closes off the vehicle interior space with respect to the adjoining vehicle space, e.g., forming the engine or luggage space; the structure is constituted by a hollow body that is accessible only from the outside for servicing the auxiliary installations and instruments.

27 Claims, 1 Drawing Figure

PATENTED MAR 6 1973
3,719,245
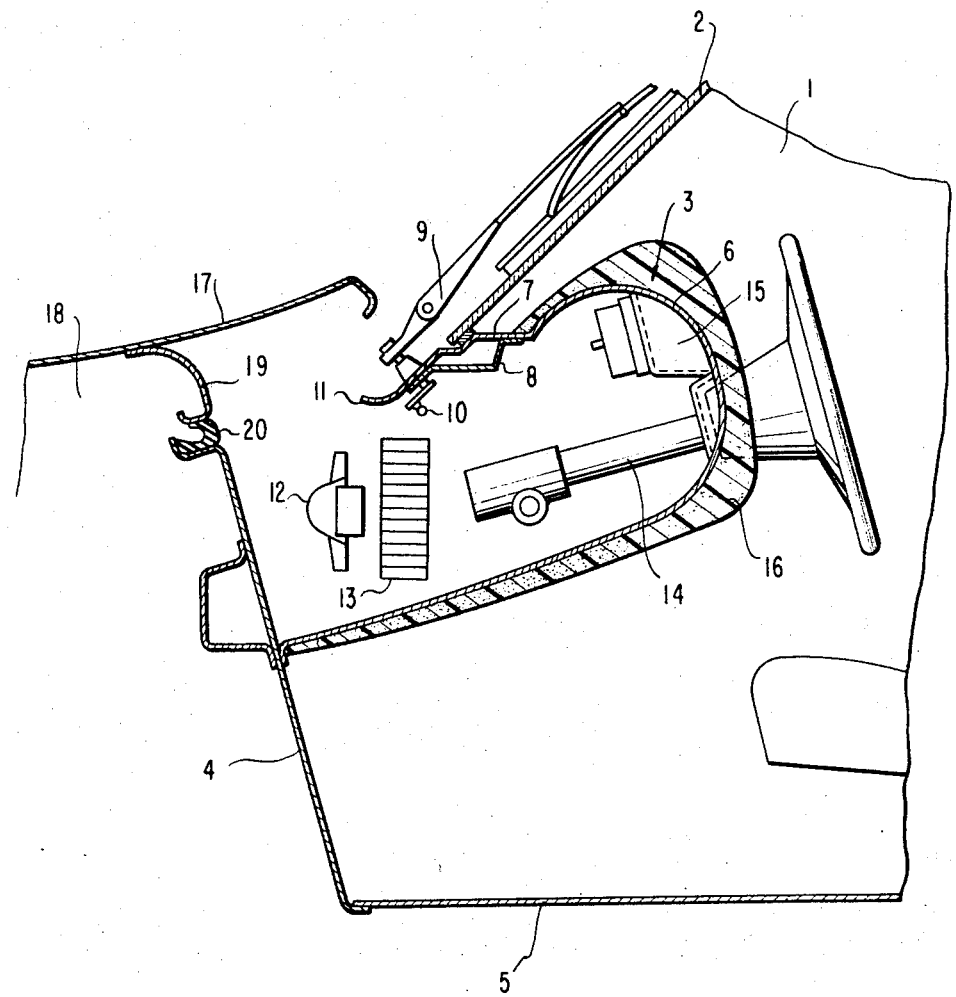
INVENTOR
KARL WILFERT
BY Craig, Antonelli,
Stewart & Hill
ATTORNEYS

3,719,245

VEHICLE STRUCTURE

The present invention relates to a forwardly disposed structure that serves for the mounting of auxiliary installations, accessories, instruments and the like, especially in passenger motor vehicles.

In the known motor vehicles, the accessories, instruments, auxiliary installations such as steering gear, windshield wiper drive, etc. are so supported below the instrument panel that they are accessible from the inside of the vehicle passenger space. The prior art dashboards or instrument-panels project box-shaped into the interior space of the vehicle and are open in the downward direction. This type of instrument panel construction entails simultaneously several disadvantages. The instruments, which are arranged in the vehicle below or behind the instrument panel are accessible in case of need, only with great difficulty. A further disadvantage is the fact that instrument panels that are open in the direction toward the bottom, considerably increase the danger of injury in case of an accident since the sharp edges of the blower, of the heating bodies, of fuse boxes, etc. are arranged directly above the legs of the driver and the co-driver or passenger seated alongside the driver.

The present invention is concerned with the task to avoid the disadvantages of the known prior art dashboard or instrument-panel installations and to provide a projecting structure suitable for the mounting of all auxiliary installations such as instruments, accessories, blower, heating body, and/or the like, which offers an optimum safety for the passengers.

The underlying problems are solved according to the present invention in that the structure projecting into the vehicle interior and closing off the vehicle interior space in the forward direction is constructed as a hollow body which is closed with respect to the engine or luggage space and which is accessible only from the vehicle outside. It is thereby very appropriate if the hollow body consists of a sheet metal base member which is constructed flat at its bottom side that is connected with the sheet metal pedal plate and, as to the rest, is constructed completely smooth. The base plate may be reinforced thereby at its end section arranged below the windshield by further sheet metal members. The smooth construction of the sheet metal base element is advantageous because on the one hand, the injury danger to the vehicle passengers is greatly reduced thereby and, on the other, the auxiliary installations can be mounted at any suitable desired place on the inside of the hollow space. It is very advantageous if the upper reinforced end section of the sheet metal base element accommodates the windshield wiper installation. The end portion of the sheet metal base member may thereby advantageously project underneath the engine hood so that, on the one hand, the upwardly facing opening of the hollow body is closed off by the engine hood and, on the other, the windshield wipers as well as the lever transmission of the windshield wiper drive are disposed within the protective area of the engine hood.

According to a further very advantageous construction of the present invention, the hollow body formed by curving the base body may be constructed on the side thereof pointing in the direction toward the vehicle interior space as instrument panel which is provided with indentations and grooves recessed inwardly with respect to the surface of the sheet metal base member, in which may be arranged in a recessed manner the actuating installations and instruments. Finally, it is additionally of great advantage if the surface of the hollow body is padded with a padding layer or cover made from foamed material of any conventional type, such as foamed synthetic resinous material. The hollow body thereby acts as a soft shock absorber in case of an impact of the driver during an accident. Furthermore, the hollow body is well suited by reason of its shape as deformation member and is able to absorb by deformation the kinetic energy of the bodies impinging thereupon.

Accordingly, it is an object of the present invention to provide a forwardly disposed inwardly projecting structure for vehicles, especially for passenger motor vehicles which avoids by simple means the aforementioned shortcomings and drawbacks encountered in the prior art.

Another object of the present invention resides in a projecting body structure, suitable as instrument panel, for passenger motor vehicles which greatly increases the safety for the passengers in case of accidents.

A further object of the present invention resides in a vehicle structure of the type described above adapted to receive the instruments, which is so constructed as to render the instruments readily accessible from the outside.

Still a further object of the present invention resides in a body structure which has such shape and configuration as to constitute a deformation member capable of absorbing impact energy by deformation.

These and further objects, features and advantages of the present invention will become more obvious from the following description when taken in connection with the accompanying drawing which shows, for purposes of illustration only, one embodiment in accordance with the present invention, and wherein:

The single FIGURE is a partial cross-sectional view in the longitudinal direction through the forward part of a passenger motor vehicle in accordance with the present invention.

Referring now to the single figure of the drawing, the vehicle interior space 1 of the illustrated passenger motor vehicle of any conventional construction is delimited in the forward direction by the windshield 2, the hollow body generally designated by reference numeral 3, the pedal plate 4 and the floor member 5. The various parts of the hollow body 3, of the pedal plate 4 and of the floor 5 may be made in a conventional manner of suitable sheet metal. The hollow body 3 is formed by a sheet metal base member 6 which extends far into the interior space 1 of the vehicle. The base member 6 which is connected with the pedal member 4, is constructed flat at its bottom side and as to the rest completely smooth, i.e., without any corners, angles or sharply projecting surface portions. It is reinforced at its upper end portion 7 disposed below the windshield 2 by a further sheet metal element 8. The reinforced end portion 7 of the base plate 6 preferably serves for the mounting of the windshield wiper installation 9 with the windshield wiper drive 10. At its end, the reinforced base plate 6 may be provided with a forwardly, upwardly curved groove 11 in which the rain water, running down along the windshield pane 2, is conducted away toward both sides of the vehicle by way of conventional channels which are not illustrated in the drawing. The auxiliary installations, for example, a blower 12, a heating body 13, the steering column 14 with the steering gear, etc. are accommodated and mounted within the hollow body 3.

The hollow body 3 is constructed at the side thereof projecting into the vehicle passenger interior space 1 as instrument panel which is provided with troughs, indentations, and grooves recessed inwardly of the body 3 with respect to the surface of the base member 6, in which the instruments 15 and the like are arranged in a recessed manner. The surface of the hollow body 3 is provided with a thick protective layer 16 of foamed material so that the vehicle passengers are protected against injuries in case of an impact. The opening of the hollow body 3, through which the instruments and auxiliary installations are serviced, is closed against the outside by the engine hood 17. With respect to the engine or luggage space 18, the hollow space 3 is closed off by the extended pedal wall or firewall 4 as well as by a web 19 disposed at the engine hood 17 and a seal 20.

As can be seen from the drawing, the hollow body 3 is well suited as deformation body by reason of its configuration projecting into the vehicle interior space 1 whereby in the case of an impact, a relatively large deformation path is available. The passenger is simultaneously protected by the padded hollow body enclosing the auxiliary installations against injuries by these auxiliary installations and instruments. However, it is also within the purview of the present invention that the hollow body is constructed as closed, pre-assembled structural unit which can be inserted and assembled into mounting means of the vehicle with all auxiliary installations in pre-assembled conditions.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A structural arrangement for accommodating auxiliary installations, instruments, and the like on a motor vehicle; said arrangement comprising: hollow body means projecting into a vehicle interior space, said hollow body means closing off the interior space from an adjoining space of the vehicle, the interior of said hollow body means being dimensioned to accommodate said auxiliary installations and the like, and access means for providing access to the interior of said hollow body means for servicing said auxiliary installations and the like only from outside of said vehicle interior space, wherein said access means comprises an extension of a hood for said adjoining space, and wherein said extension is rigid with respect to said hood such that said access means prevents access to said hollow body means when said hood is closed.

2. An arrangement according to claim 1, characterized in that the vehicle is a passenger motor vehicle with the interior space being a passenger space and in that said adjoining space is an engine or luggage space.

3. An arrangement according to claim 1, characterized in that the surface of the hollow body means facing the interior space is padded with a protective, foamed-material layer.

4. An arrangement according to claim 3, characterized in that the hollow body means together with the auxiliary installations is constructed as a closed structural assembly unit.

5. An arrangement according to claim 4, characterized in that said assembly unit is a substantially pre-assembled unit.

6. An arrangement according to claim 5, characterized in that the vehicle is a passenger motor vehicle with the interior space being a passenger space and in that said space is an engine or luggage space.

7. An arrangement according to claim 1, characterized in that said hollow body projects rearwardly into the vehicle interior space so as to close off said interior space in the forward direction with respect to the adjoining space of the vehicle.

8. An arrangement according to claim 1, characterized in that said extension extends rearwardly over a pivotal attachment for a windshield wiper.

9. An arrangement according to claim 8, characterized in that said pivotal attachment is connected directly to a forward upper portion of said hollow means.

10. An arrangement according to claim 1, characterized in that said hollow body means includes a base member which is constructed at its bottom side, connected to a pedal member, substantially flat and as to the rest, substantially completely smooth.

11. An arrangement according to claim 10, characterized in that said base member is reinforced at the end portion thereof arranged below a windshield by further reinforcing means.

12. An arrangement according to claim 11, characterized in that the upper reinforced end portion of the base member accommodates a windshield wiper installation.

13. An arrangement according to claim 12, characterized in that the hollow body means is formed by curving the base member and is constructed as an instrument panel at the side pointing toward the vehicle interior space, said instrument panel portion of said base member being provided with recesses and grooves recessed inwardly with respect to the surface of the base member, and in that actuating means and instruments are arranged recessed in said recesses and grooves.

14. An arrangement according to claim 13, characterized in that the surface of the hollow body means facing the interior space is padded with a protective, foamed-material layer.

15. An arrangement according to claim 10, characterized in that said base member is made from sheet metal.

16. An arrangement according to claim 10, characterized in that said base member includes a upper reinforced end portion accomodating a windshield wiper installation.

17. An arrangement according to claim 16, characterized in that the hollow body means is formed by curving the base member and is constructed as an instrument panel at the side pointing toward the vehicle interior space, said instrument panel portion of said base member being provided with recesses and grooves recessed inwardly with respect to the surface of the base member, and in that actuating means and instruments are arranged recessed in said recesses and grooves.

18. An arrangement according to claim 10, characterized in that the hollow body means is formed by curving the base member and is constructed as an instrument panel at the side pointing toward the vehicle interior space, said instrument panel portion of said base member being provided with recesses and grooves recessed inwardly with respect to the surface of the base member, and in that actuating means and instruments are arranged recessed in said recesses and grooves.

19. A structural arrangement for accommodating auxiliary installations, instruments and the like on a motor vehicle; said arrangement comprising: hollow body means projecting into a vehicle interior passenger space, said hollow body means closing off the interior space from an adjoining engine or luggage space of the vehicle, the interior of said hollow body means being dimensioned to accommodate said auxiliary installations and the like, and access means for providing access to the interior of said hollow body means only from outside of said vehicle interior space, wherein a pivotal attachment for a windshield wiper is connected directly to a forward upper portion of said hollow body means, wherein said access means comprises an extension of a hood for said engine or luggage space, said extension extending rearwardly over the pivotal attachment for the windshield wiper, and wherein said hollow body means comprises a sheet metal member extending to a top attachment immediately adjacent a vehicle windshield, said pivotal attachment being in said sheet metal member adjacent the windshield.

20. An arrangement according to claim 19, characterized in that the surface of the hollow body means is padded with a protective, foamed-material layer.

21. An arrangement according to claim 19, characterized in that the hollow body means together with the auxiliary installations is constructed as closed structural assembly unit.

22. An arrangement according to claim 21, characterized in that said assembly unit is a substantially pre-assembled unit.

23. An arrangement according to claim 19, characterized in that said sheet metal member includes an extension which extends forwardly of a sealing connection with the bottom of the windshield, said last-mentioned extension including the pivotal attachment with the windshield wiper.

24. An arrangement according to claim 23, characterized in that the most forward portion of said last-mentioned extension is formed as a rain groove.

25. An arrangement according to claim 24, characterized in that the extension of the hood forming the access means is rigid with respect to said hood such that said access means is closed when said hood is closed.

26. An arrangement according to claim 19, wherein said hollow body means projects rearwardly into the vehicle interior space so as to close off said interior space in a forward direction with respect to the adjoining space of the vehicle.

27. An arrangement according to claim 19, wherein said sheet metal member extends from a bottom attachment at a pedal plate forming a wall of said engine or luggage space to said top attachment.

* * * * *